(12) United States Patent
Albrecht et al.

(10) Patent No.: US 8,091,781 B2
(45) Date of Patent: Jan. 10, 2012

(54) TRANSACTION PRODUCT WITH CARD AND STICKER

(75) Inventors: Jessica D. Albrecht, Woodbury, MN (US); Erin M. Borkowski, Andover, MN (US); Amy Lauer, Hopkins, MN (US); Christina T. Baune, Maple Gove, MN (US); Lindsay M. Satrom, Plymouth, MN (US); Tanya Starr, St. Louis Park, MN (US); Lindsay Fischer, Minneapolis, MN (US); Timothy D. Schumann, Arden Hills, MN (US)

(73) Assignee: Target Brands, Minneapolis, MN (US)

( * ) Notice: Subject to any disclaimer, the term of this patent is extended or adjusted under 35 U.S.C. 154(b) by 293 days.

(21) Appl. No.: 12/610,299

(22) Filed: Oct. 31, 2009

(65) Prior Publication Data

US 2011/0101089 A1     May 5, 2011

(51) Int. Cl.
*G06K 5/00*     (2006.01)
(52) U.S. Cl. ......... 235/380; 235/487; 235/375; 235/381
(58) Field of Classification Search .................. 235/380, 235/375, 381, 487, 488; 283/100, 101
See application file for complete search history.

(56) References Cited

U.S. PATENT DOCUMENTS

| | | | |
|---|---|---|---|
| 5,640,447 A | 6/1997 | Fonseca | |
| 5,997,042 A | 12/1999 | Blank | |
| 6,089,611 A | 7/2000 | Blank | |
| 6,161,870 A | 12/2000 | Blank | |
| 6,588,658 B1 | 7/2003 | Blank | |
| 7,004,398 B1 | 2/2006 | Francis et al. | |
| 7,032,817 B2 | 4/2006 | Blank | |
| 7,055,740 B1 | 6/2006 | Schultz et al. | |
| 7,198,196 B2 | 4/2007 | Halbur et al. | |
| 7,234,639 B2 | 6/2007 | Schultz et al. | |
| 7,252,225 B2 | 8/2007 | Schultz et al. | |
| 7,293,701 B2 | 11/2007 | Halbur et al. | |
| D560,717 S | 1/2008 | Robertson et al. | |
| 7,322,519 B2 | 1/2008 | Blank et al. | |
| 7,392,952 B2 * | 7/2008 | Corcoran et al. | 235/487 |
| 7,409,788 B2 | 8/2008 | Lauer et al. | |
| 8,002,197 B1 * | 8/2011 | Whitaker | 235/493 |
| 2004/0249748 A1 | 12/2004 | Schultz et al. | |
| 2006/0186196 A1 | 8/2006 | Schultz et al. | |

(Continued)

OTHER PUBLICATIONS

"GO-Tag™ Solution," firstdata.com, 2008, 2 pages.

(Continued)

*Primary Examiner* — Edwyn Labaze
(74) *Attorney, Agent, or Firm* — Griffiths & Seaton PLLC (57) ABSTRACT

A transaction product for a retail display includes a transaction sticker and a transaction card. The transaction sticker defines a front surface and a rear surface opposite the front surface. The transaction sticker includes a first account identifier linking the transaction sticker to an account or record configured to track a value available for use toward a purchase of goods and services. The first account identifier is machine readable by a point-of-sale terminal. The rear surface is coated with a pressure sensitive adhesive. The transaction card defines a first surface and a second surface opposite the first surface and including a second account identifier. The second account identifier is machine readable by the point-of-sale terminal. The transaction sticker is releasably coupled to the transaction card and is configured to be removed from the transaction card and applied to an article. Other cards, products, combinations and associated methods are also disclosed.

24 Claims, 10 Drawing Sheets

U.S. PATENT DOCUMENTS

2008/0223939 A1    9/2008   Halbur et al.
2008/0245875 A1   10/2008   Holt et al.
2008/0290180 A1   11/2008   Lauer et al.

OTHER PUBLICATIONS

"Contactless Payments: Consumer Trends and Usage Preferences," firstdata.com, 2008, 2 pages.

"Peal-A-Deal® Bar Coded Card," http://www.peeladeal.com/products.php?code=pad_barcode&prod=Bar%20Coded%20Card, available at least as early as Aug. 27, 2009, 3 pages.

"Transaction Card Assembly With Subject and Stand Portions, Electrostatic Clings and a Backer," U.S. Appl. No. 12/301,335, filed Aug. 29, 2008.

* cited by examiner

TRANSACTION PRODUCT WITH CARD AND STICKER

BACKGROUND OF THE INVENTION

Stored-value cards and other transaction cards come in many forms. A gift card, for example, is a type of transaction card that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product for a retail display including a transaction sticker and a transaction card. The transaction sticker defines a front surface and a rear surface opposite the front surface. The transaction sticker includes a first account identifier, and the first account identifier links the transaction sticker to an account or record configured to track a value available for use toward a purchase of one or more of goods and services. The first account identifier is machine readable by a point-of-sale terminal. The rear surface is coated with a pressure sensitive adhesive. The transaction card defines a first surface and a second surface opposite the first surface and including a second account identifier. The second account identifier is machine readable by the point-of-sale terminal. The rear surface of the transaction sticker is releasably coupled to the first surface of the transaction card via the pressure sensitive adhesive. The transaction sticker is configured to be removed from the transaction card and applied to a consumer article via the pressure sensitive adhesive. Stored-value product assemblies, methods of providing a transaction product, and other embodiments of stored-value or transaction products and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or transaction card, such as a gift card or other transaction card, is adapted for making purchases of goods and/or services at, for example, a retail store or web site. According to one embodiment, an original consumer buys a transaction card to give a recipient who in turn is able to use it to pay for goods and/or services. A transaction card, according to embodiments of the present invention, is provided as part of a transaction product is also included a second or supplemental tender form linked to an account or record and configured for use to pay for goods and/or services. The supplemental tender form is a transaction sticker configured to be coupled with any object of the consumer's choice and includes a link to the same or a different account or record as the transaction card. In one embodiment, the transaction sticker may be removed from an object and reapplied to a different object if the consumer desires. As such, the consumer is provided with two means for accessing funds stored in the account or record, namely, the transaction card and the transaction sticker.

Figure 1:
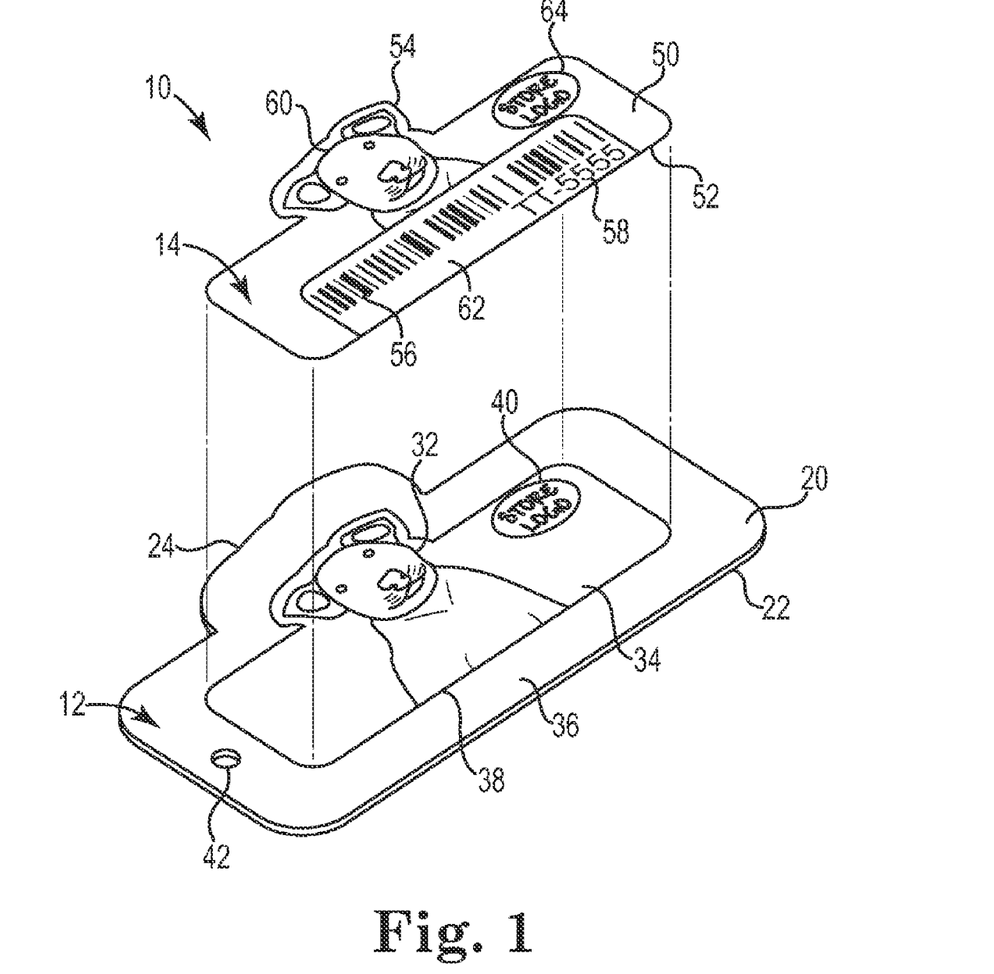
FIG. 1 is a perspective view illustration of a transaction product, according to one embodiment of the present invention.

Turning to the figures, FIG. 1 illustrates one embodiment of a transaction product 10. The transaction product 10 includes a transaction card 12 (e.g., a stored-value card, gift card, or calling card) or any other suitable transaction article (e.g., any three-dimensional and/or otherwise functionable transaction article) and a transaction sticker 14. In one example, transaction sticker 14 resembles at least a portion of transaction card 12 and is adhered to transaction card 12 as will be further described below.

Figure 2:
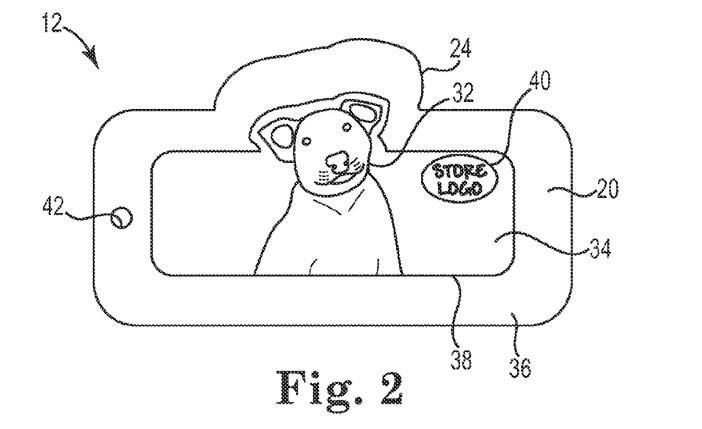
FIG. 2 is a front view illustration of a transaction card of the transaction product of FIG. 1, according to one embodiment of the present invention.

In one embodiment, transaction card 12 or any other suitable transaction article defines a front surface 20 (i.e., a first major surface) and a rear surface 22 (i.e., a second major surface) opposite front surface 20 separated by a thickness of transaction card 12. In one embodiment, at least one of front and rear surfaces 20 and 22 is substantially planar. In one example, transaction card 12 is substantially rectangular in shape and/or may include other shapes extending from one or more sides of the substantially rectangular shape. In one embodiment, transaction card 12 is similarly sized to or sized slightly smaller than an identification card, a credit card, or other card sized to fit in a wallet of a card bearer (i.e. is wallet sized). In other embodiments, transaction card 12 is otherwise shaped as a square, circle, oval, star, or any other suitable shape. Regardless of shape, transaction card 12 defines an outer perimeter 24 thereof, which also serves as an outer perimeter of front and rear surfaces 20 and 22.

Transaction card 12 is formed of any suitable substrate such as a somewhat rigid yet flexible material in a substantially planar form. More specifically, in one embodiment, transaction card 12 is a substantially planar member formed of plastic (e.g. polycarbonate, polystyrene, polyvinyl chloride (PVC), acrylonitrile butadiene styrene (ABS), polyethylene terephthalate (PET), teslin, polyactide (PLA) or acrylic), a composite configured to function as a stored-value device as well as a temporary support for transaction sticker 14. In one embodiment, transaction card 12 is cut from sheetstock plastic material. Transaction card 12 can be formed in any other suitable planar or non-planar configuration as will be apparent to those of skill in the art upon reading this application.

Figure 3:
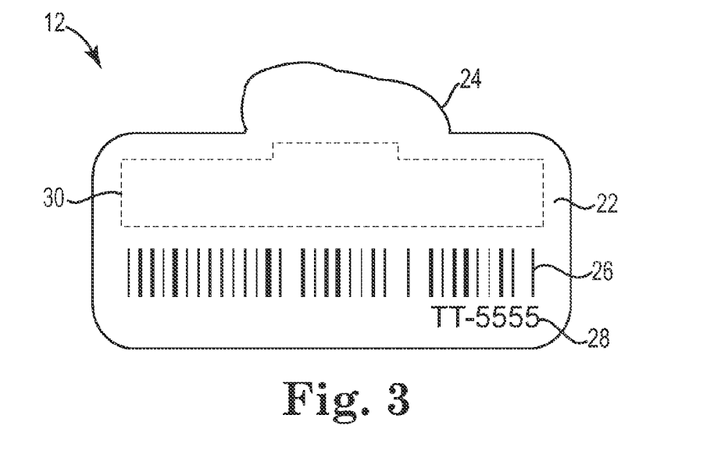
FIG. 3 is a rear view illustration of the transaction card of FIG. 2, according to one embodiment of the present invention.

Referring to the rear view illustration of FIG. 3, in one example, rear surface 22 of transaction card 12, or any other suitable portion of transaction card 12, includes at least one account activation area or account identifier 26, such as a bar code, magnetic strip, a smart chip or other electronic device, a radio frequency identification (RFID) device or other suitable identifier readily machine readable by a point-of-sale terminal or other account access station or kiosk. Account identifier 26 indicates an account or record to which transaction card 12 is linked. The account or record of the monetary or other balance on transaction card 12 optionally is maintained on a database, other electronic or manual record-keeping system or, in the case of "smart" cards for example, on a chip or other electronic device(s) on transaction card 12 itself. Accordingly, by scanning account identifier 26, the account or record linked to transaction card 12 is identified and can subsequently be activated, have amounts debited therefrom, and/or have amounts added thereto.

In one embodiment, account identifier 26 includes a character string or code 28 (e.g., a number and/or letter string) configured to provide additional security to the user of transaction card 12 and/or configured to be read by a bearer of transaction card 12 to facilitate use of transaction card 12 for web site or other purchases outside of brick-and-mortar type retail establishments. With the above in mind, account identifier 26 is one example of means for linking transaction card 12 with an account or record, and scanning of account identifier 26 is one example of means for activating or loading value on transaction card 12. Transaction card 12 is one example of means for supporting account identifier 26.

In one embodiment, redemption indicia 30 are included on transaction card 12 such as on rear surface 22 of transaction card 12 as generally indicated by the dashed box in FIG. 3. Redemption indicia 30 indicate that transaction card 12 is redeemable for the purchase of goods and/or services and that, upon use, a value of the purchased goods and/or services will be deducted from the account or record linked to transaction product 10. In one embodiment, redemption indicia 30 include phrases such as "<NAME OF STORE> GiftCard" and "This GiftCard is redeemable for merchandise or services at any of our stores or at our web site," and/or provides help or phone line information in the case of a lost, stolen, or damaged transaction card, etc. In one embodiment, redemption indicia 30 also indicate information regarding transactional use of transaction sticker 14.

In one embodiment, front surface 20 of transaction card 12 defines a first, inner portion 34, a second, outer portion 36, and a boundary 38 therebetween. In one example, outer portion 36 extends entirely around inner portion 34 and boundary 38 to outer perimeter 24 of transaction card 12. In one embodiment, inner portion 34 is shaped similarly to transaction card 12 (i.e., outer perimeter 24), but is smaller than inner portion 34. In one example, front surface 20 includes graphical indicia 32. Graphical indicia 32 include any suitable graphics such as pictures, images, text, drawings, or combinations thereof. In one embodiment, graphical indicia 32 serve to visually emphasize boundary 38 such that boundary 38 and inner portion 34 and outer portion 36 are readily identifiable and differentiated from one another. In one embodiment, boundary 38 is a line and/or is shaped similar to, but inset from and smaller than, outer perimeter 24 of transaction card 12. In one example, graphical indicia 32 on inner portion 34 depict a character, scene, depiction, and/or brand identifiers 40 while graphical indicia 32 on outer portion 36 provide a color or pattern as a border or frame around graphical indicia 32 of inner portion 34.

In one example, transaction card 12, for example, front surface 50 of transaction card 12, includes one or more of a brand identifier 40. Brand identifier 40 includes one or more of a logo, text, trademark, etc. that associate transaction product 10 with at least one of a product, a brand, a store, etc. In one example, brand identifier 40 indicates a store or location configured to receive transaction card 12 as payment toward goods and/or services.

In one example, an aperture 42 is formed through transaction card 12 to facilitate coupling of transaction card 12 to another member, such as a key chain, of the end consumer to increase the ease of use and ready location of transaction card 12. Other variations in forming transaction card 12 will be apparent to those of skill in the art upon reading this application. For example, another transaction article having any other suitable configuration and an at least partially planar surface may be used in lieu of transaction card 12. In another embodiment, transaction card 12 may not include account identifier 26 such that transaction card 12 by itself would not be redeemable toward a purchase or use of goods and/or services.

Figure 4:
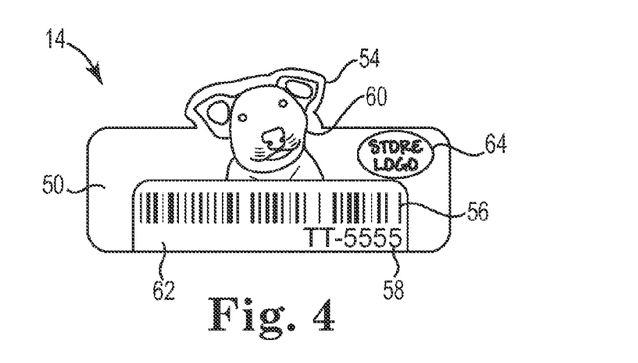
FIG. 4 is a front view illustration of a transaction sticker of the transaction product of FIG. 1, according to one embodiment of the present invention.

Referring to FIGS. 1 and 4, in one embodiment, transaction sticker 14 is formed of any suitable substantially planar, somewhat flexible member (e.g., polypropylene) and defines a front surface 50 and a rear surface 52. Rear surface 52 is substantially planar and is coated with a pressure release adhesive or other suitable adhesive. As such, transaction sticker 14 can be considered a releasably adhesive label. Transaction sticker 14 may take any suitable shape. In one embodiment, transaction sticker 14 is shaped similarly to transaction card 12 and/or boundary 38 between inner portion 34 and outer portion 36 of transaction card 12.

Transaction sticker 14 includes an account identifier 56 such as a bar code, magnetic strip, a smart chip or other electronic device, a radio frequency identification (RFID) device or other suitable identifier readily machine readable by a point-of-sale terminal or other account access station or kiosk. In one embodiment, such as where account identifier 56 is in the form of a bar code, account identifier 56 is included on front surface 50 of transaction sticker 14. Account identifier 56 indicates an account or record to which transaction sticker 14 is linked. In one embodiment, account identifier 56 indicates either the same account or record or a different account or record than account identifier 26 of transaction card 12. In one embodiment, the account identifier 56 of transaction sticker 14 is substantially identical to account identifier 26. For example, account identifier 56 and account identifier 26 may be or include the same bar code. Similar to account identifier 26, by scanning or otherwise mechanically reading account identifier 56 via a point-of-sale terminal, the account or record linked to transaction sticker 14 is identified and can subsequently be activated, have amounts debited therefrom, and/or have amounts added thereto.

In one embodiment, account identifier 56 includes a character string or code 58 (e.g., a number and/or letter string) configured to provide additional security to the user of transaction sticker 14 and/or configured to be read by a bearer of transaction card 12 to facilitate use of transaction sticker 14 for web site or other purchases outside of brick-and-mortar type retail establishments. With the above in mind, account identifier 56 is one example of means for linking transaction sticker 14 with an account or record, and scanning of account identifier 56 is one example of means for activating or loading value on transaction sticker 14. Transaction sticker 14 is one example of means for supporting account identifier 56. In one embodiment, transaction sticker 14 is equal to transaction card 12 in the ability of transaction sticker 14 to provide account identifier 56 and be used toward the purchase of goods and/or services and/or as means for reloading value to transaction product 10 and the associated account.

According to one embodiment, front surface 50 of transaction sticker 14 includes graphical indicia 60. Graphical indicia 60 include any suitable graphics such as pictures, images, text, drawings, or combinations thereof. In one embodiment, graphical indicia 60 of transaction sticker 14 are substantially similar to graphical indicia 32 of transaction card 12 except for an account identifier field 62 extending across graphical indicia 60. Account identifier field 62 provides a neutral background for account identifier 56, and account identifier 56 is provided on account identifier field 62. For example, where account identifier 56 is a bar code, account identifier field 62 provides a rectangular or otherwise shaped, solid color, light background such that the bar code can more easily and accurately be read by a point-of-sale terminal or other optical reader. In one example, transaction sticker 14 includes brand identifiers 64 as part of or a supplement to graphical indicia 60.

In one embodiment, placing transaction sticker 14 on transaction card 12, for example, on front surface 20 of transaction card 12, assembles transaction product 10. In one example, transaction sticker 14 is sized and shaped similarly to and/or slightly larger than inner portion 34, and transaction sticker 14 is applied to entirely cover inner portion 34. In one embodiment, transaction sticker 14 is sized to also cover at least a portion of boundary 38 and outer portion 36, but does not cover all of outer portion 36. In one example, upon assembly of transaction product 10, a user viewing the front of transaction product 10 is able to see front surface 50 of transaction sticker 14 in its entirety and only outer portion 36 of transaction card 12, which appears as a frame extending outwardly from and entirely around outer perimeter 54 of transaction sticker 14. In this manner, transaction product 10 appears as a coordinated and integrated product. Transaction sticker 14 can be placed in any other suitable position relative to transaction card 12 as will be apparent to those of skill in the art upon reading this application.

Figure 5:
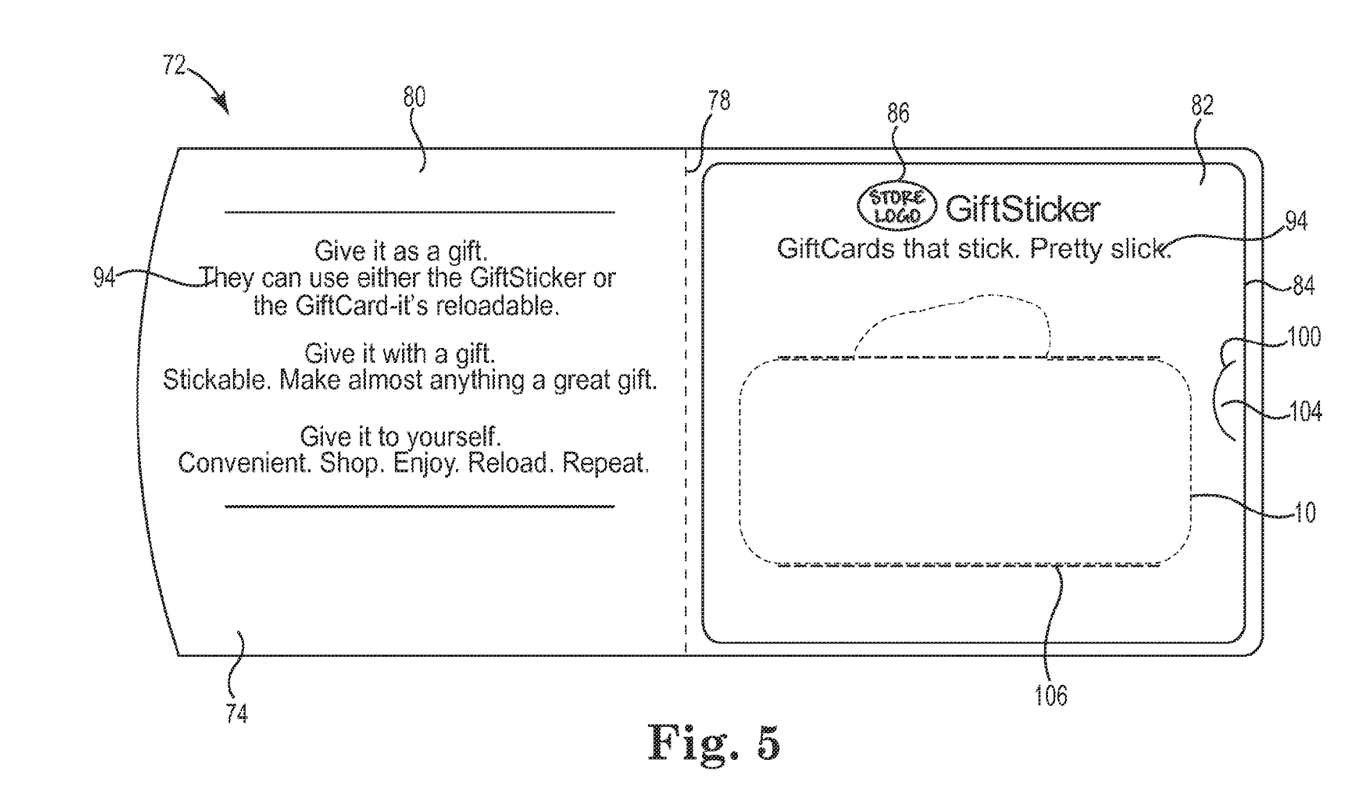
FIG. 5 is a front view illustration of a backer configured to support the transaction product of FIG. 1, according to one embodiment of the present invention.
Figure 6:
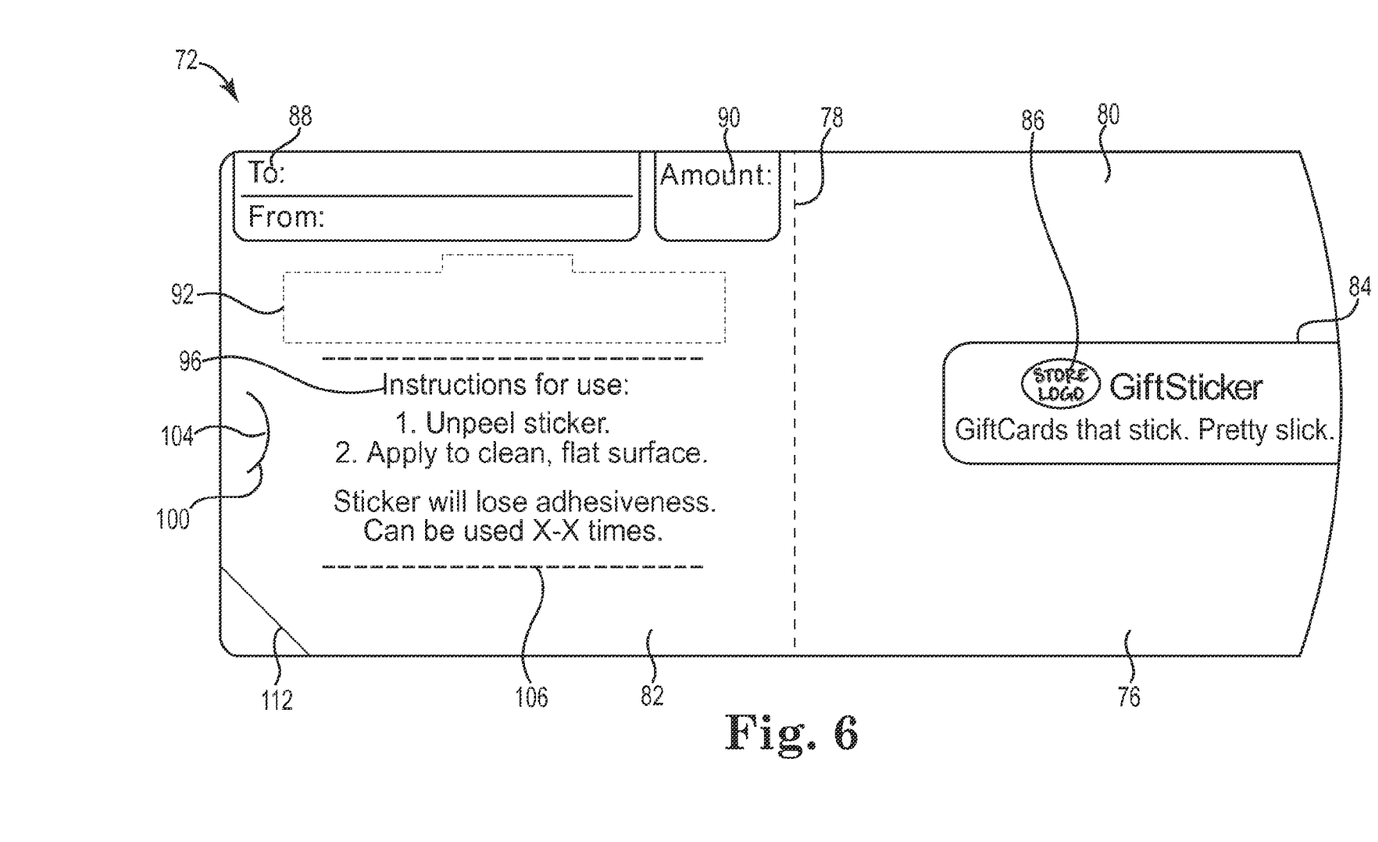
FIG. 6 is a rear view illustration of the backer of FIG. 5, according to one embodiment of the present invention.
Figure 7:
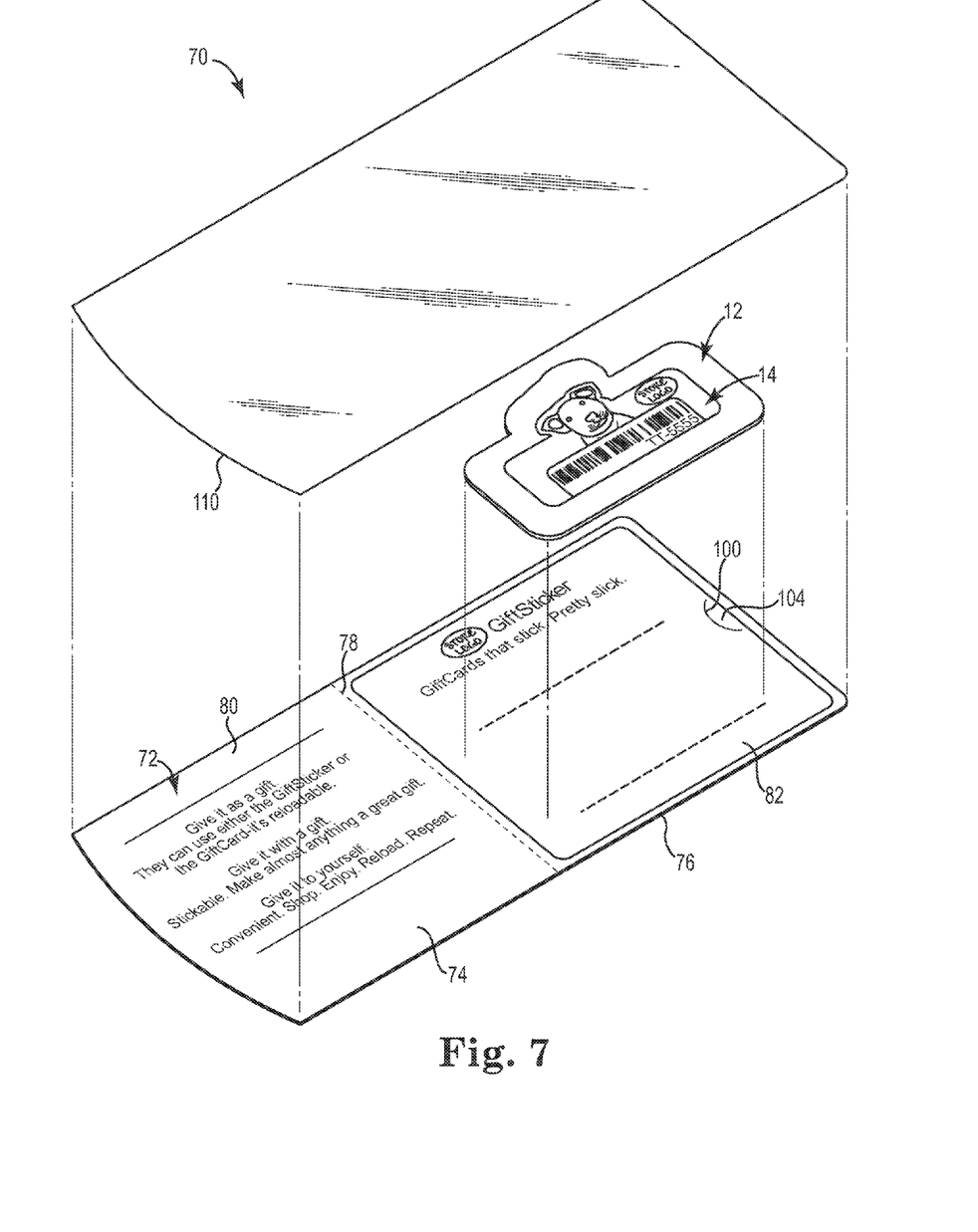
FIG. 7 is a perspective view illustration of a transaction product assembly including the backer of FIG. 5 and the transaction product of FIG. 1, according to one embodiment of the present invention.

FIGS. 5 and 6 illustrate a carrier or backer 72 for supporting transaction product 10 (FIGS. 1-4) to collectively form a transaction product assembly 70 as indicated with additional reference to FIG. 7. Backer 72 comprises a single layer or multiple layers of paper or plastic material, for example, generally in the form of a relatively stiff but bendable/flexible card. Use of other materials is also contemplated. As such, backer 72 defines a first or inside surface 74 (FIG. 5) and a second or outside surface 76 (FIG. 6). Transaction product 10, which is generally represented in dashed lines in FIG. 5 for illustrative purposes (e.g., to allow for full viewing of inside surface 74), is readily releasably attached to backer 72, for example, by adhesive, blister packaging, overlying skinning material and/or the like, such that transaction product 10 with backer 72 collectively define transaction product assembly 70 (FIG. 7).

In one embodiment, backer 72 is a bi-fold substrate defining one or more fold lines 78, about which backer 72 is foldable roughly in half to define a first panel 80 and a second panel 82 on opposite sides of fold line(s) 78. In FIGS. 5-7, backer 72 is unfolded, i.e. is in an open configuration. In one example, while on display in a retail store, backer 72 is folded back about fold line(s) 78 to present only portions of inside surface 74 of backer 72 defined by second panel 82 where second panel 82 supports transaction product 10. Backer 72 may be configured in any alternative or additional manners to facilitate placement of backer 72 in a retail setting. For example, backer 72 may include an aperture, hook, etc. to facilitate hanging transaction product assembly 70 in a retail display. In view of the above, backer 72 is one example of means for supporting transaction product 10 and all of transaction product assembly 70 for display in a retail setting.

After purchase or at any other suitable time, backer 72 is foldable about fold line(s) 78 such that the FIG. 5 inside surface 74 of backer 72 are folded over itself and transaction product 10 is enclosed or wrapped in a compact package formed by foldable backer 72. In this manner, outside surface 76 of backer 72 (i.e., the surfaces illustrated in FIG. 6) are disposed toward the outside of the folded, compact package, according to embodiments of the invention. In one embodiment, folded backer 72 effectively wraps transaction product 10 for presentation from an original consumer to a recipient.

In one embodiment, a cut 100 is formed through backer 72 near an edge of backer 72 spaced from and substantially parallel to fold line(s) 78. Cut 100 extends partially toward fold line(s) 78 and defines a flap 104, which can be partially bent away from the remainder of backer 72. More specifically, upon folding of backer 72 about fold line(s) 78 to close backer 72 around transaction product 10, an opposing edge of backer 72 is tucked beneath flap 104 to maintain backer 72 in a folded or closed position. In one embodiment, cut 100 and flap 104 are each substantially semi-circular in shape. Other backers having various sizes and shapes, such as other foldable and non-foldable backers (not shown), can be used with various sizes and shapes of transaction products 10.

In one embodiment, backer 72 includes any one or more of indicia, graphics or text information including store logo(s), store name(s), slogans, advertising, instructions, directions, brand indicia, promotional information, holiday indicia, seasonal indicia, media format identifiers, characters, and/or other information. The various indicia may be included on one or more of inside surface 74 and outside surface 76. In one example, the indicia include one or more of decorative indicia 84, brand indicia 86, message field indicia 88, amount indicia 90, redemption indicia 92, promotional indicia 94, instructional indicia 96, etc.

Decorative indicia 84 are provided in any suitable size or type and are configured to generally increase the aesthetic appeal of backer 72 and, therefore, transaction product assembly 70 as a whole. In one embodiment, any decorative indicia 84 may correspond or visually correlate to indicia on either one or both of transaction card 12 and transaction sticker 14. Brand indicia 86 identify a store, brand, department, etc. and/or services associated with transaction product 10. For example, brand indicia 86 indicate a store configured to receive either one or both of transaction card 12 and transaction sticker 14 as tender toward a purchase of goods and/or services.

Message field indicia 88, for example, include one or more of "to," "from," and "message" fields and are configured to be written to by the bearer of transaction product assembly 70 prior to presenting transaction product assembly 70 to a recipient. Amount field indicia 90 include "Amount:" in a writable field for a consumer, retail store employee, etc. to write the corresponding initial value added to the account or record associated with transaction product 10 to backer 72. As such, in one embodiment, message field indicia 88 and/or amount field indicia 90 facilitate the consumer in preparing transaction product assembly 70 for presentation to a recipient.

Redemption indicia 92, which are generally indicated with a dashed line box in FIG. 6, inform a bearer of transaction product assembly 70 that transaction card 12 and transaction sticker 14 are each redeemable for the purchase or use of goods and/or services and that upon use, a value of the purchased goods and/or services will be deducted from the financial account or record linked to transaction product 10. In one embodiment, redemption indicia 92 include phrases such as "<NAME OF STORE> GiftCard and GiftSticker" and "This GiftCard and GiftSticker are redeemable for merchandise or services at any of our stores or at our website," and/or provides help or phone line information in case of a lost, stolen or damaged transaction card 12 or transaction sticker 14, etc.

Promotional indicia 94 serve to promote transaction product assembly 70 to potential consumers and are directed to encourage purchase of transaction product assembly 70. For example, promotional indicia 94 tout that both transaction card 12 and transaction sticker 14 are coupled with an account or record and/or can be used toward a purchase payment, etc. and the benefits to such use. Instructional indicia 96 provide details about how a consumer uses transaction product 10 and/or portions thereof. In one example, instructional indicia 96 instruct consumers that transaction sticker 14 can be unpeeled or removed from transaction card 12 and applied to any other suitable surface. In one embodiment, instructional indicia 96 also or alternatively provide information about any possible workings of transaction sticker 14, such as how many times transaction sticker 14 can be repeatedly removed and adhered to objects before the adhesive on transaction sticker 14 is likely to loose a substantially amount of its adhesion properties, or other information.

Any other indicia such as decorative indicia may also be included on backer 72. For example, any of indicia 84, 86, 88, 90, 92, 94, 96 or other indicia optionally may appear anywhere on backer 72, transaction card 12, or transaction sticker 14. Additional information besides that specifically described and illustrated herein may also be included.

Transaction product 10 is coupled with backer 72 in any suitable manner, e.g., adhesive, ultrasonic welding, etc. In one embodiment, transaction product 10 is coupled with inside surface 74 of second panel 82 of backer 72 such that either one or both of card account identifier 26 or sticker account identifier 56 are accessible to be read by a point-of-sale terminal without removing transaction product 10 from backer 72. In one embodiment, second panel 82 includes alignment demarcations 106, for example, in the form of perforation lines, to assist in aligning and positioning transaction product 10 in a desired location on backer 72. In one example, alignment demarcations 106 are two parallel lines configured to indicate where top and bottom linear edges of transaction product 10 should be placed. Alignment demarcations 106 facilitate controlled placement of transaction product 10 such that mass produced transaction product assemblies 70 have a consistent appearance across a plurality of transaction product assemblies 70.

In one example, a skinning material 110 that is substantially translucent or transparent is placed over and in direct contact with inside surfaces 74 of carrier and transaction product 10, for example, over and in direct contact with each of transaction card 12 and transaction sticker 14. Skinning material 110 may be any suitable material, such as plastic, applied in any suitable manner, such as with adhesive, heat, and/or vacuum forming. Skinning material 110 couples (e.g., at least partially couples) backer 72 to transaction product 10 and additionally, provides security by generally preventing one from removing transaction sticker 14 without the knowledge of a future consumer and/or retail employee. As such, skinning material 110 is an anti-theft and fraud measure. In one embodiment, a cut 112 through most but not all a thickness of backer 72 is provided across a corner of backer 72. Cut 112 is configured to facilitate separating backer 72 from skinning material 110 following purchase of transaction product assembly 70. More specifically, a user is able to grasp a corner of backer 72 adjacent cut 112, bend backer 72 along cut to separate the corner from a remainder of backer 72 and to use the corner, which is still attached to skinning material 110, as a handle to peel back a remainder of skinning material 110.

Figure 8:
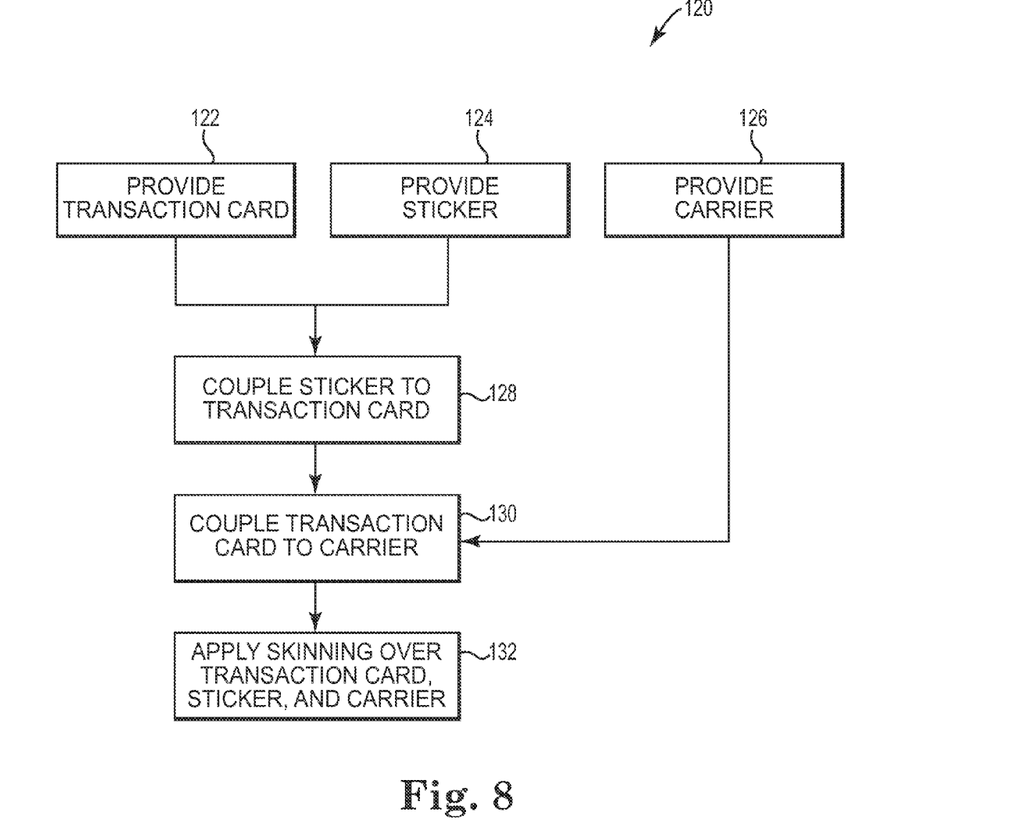
FIG. 8 is a flow chart illustrating a method of assembling a transaction product assembly, according to one embodiment of the present invention.

FIG. 8 is a flow chart illustrating a method of assembling transaction product assembly 70 as generally indicated at 120. At 122, 124, and 126, transaction card 12, transaction sticker 14, and backer 72, respectively, are each provided by manufacture and may be provided by a third party, for example, with the features described above.

At 128, transaction sticker 14 is coupled with transaction card 12. More particularly, in one embodiment, rear surface 52 of transaction sticker 14 covered with adhesive is applied to first surface 50 of transaction card 12 to adhere transaction sticker 14 thereto. In one embodiment, transaction sticker 14 is applied to cover an entirety of or a substantially entirety of inner portion 34 of transaction card 12, for example, where transaction sticker graphical indicia 60, etc. of transaction sticker 14 are such that transaction sticker 14 appears substantially similar to inner portion 34 of transaction card 12 except for, perhaps, account identifier field 62 with account identifier 56 therein. In one example, transaction sticker 14 is slightly larger than inner portion 34 such that transaction sticker 14 covers both inner portion 34 and all of boundary 38 between inner portion 34 and outer portion 36.

At 130, transaction product 10 formed at 128 is placed on and coupled with backer 72 to form transaction product assembly 70. For example, transaction product 10 is positioned on second panel 82 of backer 72 such that linear edges of transaction product 10 (e.g., of transaction card 12) align with and fit between alignment demarcations 106. Transaction product 10 may be adhered or otherwise coupled with backer 72. In one example, at 132, skinning material 110 is applied over inside surfaces 74 of backer and transaction product 10 to alternatively or additionally secure transaction product 10 to backer 72 and/or to decrease the chance of fraudulent removal of transaction sticker 14 from transaction product assembly 70.

Figure 9:
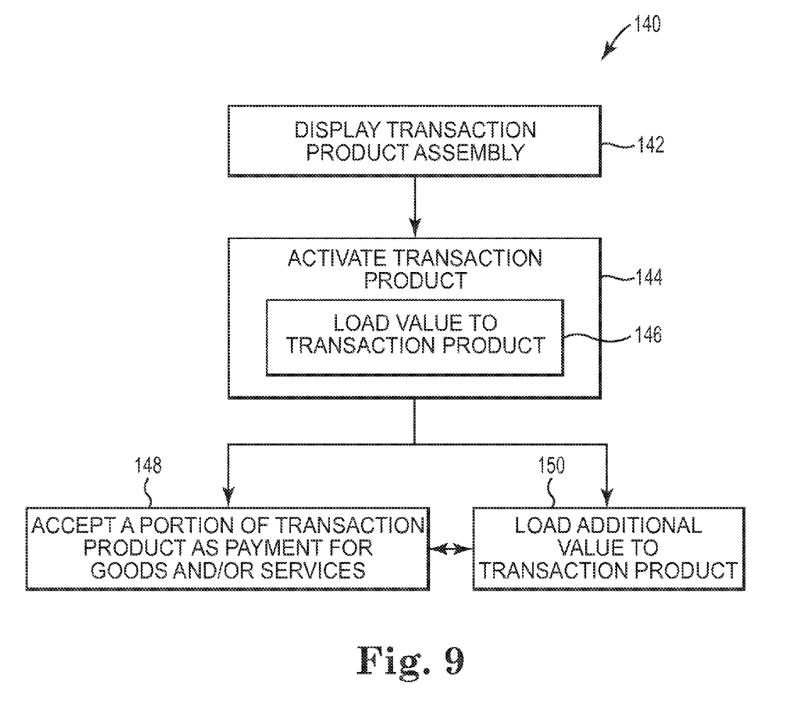
FIG. 9 is a flow chart illustrating a method of encouraging purchase and facilitating use of a transaction product, according to one embodiment of the present invention.

FIG. 9 is a flow chart illustrating one embodiment of a method 140 of encouraging purchase and facilitating use of transaction product 10 by consumers and/or recipients. At 142, transaction product 10 is placed on or hung from a rack, shelf, or other similar device to display transaction product 10 for sale to potential consumers. In one embodiment, transaction card assembly 70 is presented to potential consumers on a retail display such that potential consumers are able to view at least portions of transaction card 12, transaction sticker 14, and promotional indicia 94. In one embodiment, a depiction of transaction product 10 is additionally or alternatively placed on a website for viewing and purchase by potential consumers.

At 144, a consumer who has decided to purchase transaction product 10 presents transaction product 10 on backer 72 to a retail store employee, retail store kiosk, remote terminal, or other person or device to scan at least one of account identifier 26 and account identifier 56 to access an account or record linked to account identifier 26 and/or account identifier 56. In one example, account identifier 56 is read and used to activate both transaction card 12 and transaction sticker 14 for use. In another embodiment, backer 72 may be provided with a window (not shown) or foldable flap (not shown) to allow account identifier 26 of transaction card 12 to be scanned through backer 72 without removing transaction product 10 from backer 72.

Upon accessing the account or record, then, at 146, value is added to the account or record in the form of monetary value, points, minutes, etc. Thus, transaction product 10, more specifically, transaction card 12 and transaction sticker 14, are both activated and loaded for use toward future payments or purchases. In one example, a predetermined value is associated with transaction product 10 (i.e., associated with a common account or record linked to transaction product 10 via account identifiers 26 and 56) prior to activation and display, but such predetermined value is not initially available for use toward the purchase or use of goods and/or services. In such an embodiment, at 144, transaction product 10 is activated to permit subsequent access to the predetermined value (e.g., subsequent loading on and debiting from the account or record) and no additional value is added during activation such that operation 146 may be eliminated. In one example, two account or records are activated when account identifier 26 of transaction card 12 and account identifier 56 of transaction sticker 14 indicate or link to two different account or records as will be apparent to those of skill in the art upon reading this application.

Once transaction product 10 is activated and loaded, transaction product 10 can be used by the consumer or any other bearer of transaction product 10, more particularly, both of transaction card 12 and transaction sticker 14, can be used toward a purchase of goods and/or services at the affiliated retail setting (e.g., a retail store or website) or can be used in exchange for calling minutes, etc. In one embodiment, where transaction product 10 is displayed on a website at 142, then, at 144, transaction product 10 may be activated in any suitable method and may not require the physical scanning of account identifier 26 and/or account identifier 56 to be activated or to otherwise access the associated account or record such as at 146.

In one example, at 148, the retail store or other affiliated retail setting or website accepts transaction card 12 and/or transaction sticker 14 as payment toward the purchase of goods and/or services made by the current bearer of transaction card 12 and/or transaction sticker 14. In particular, the value currently loaded on transaction product 10 (i.e., stored or recorded in the account or record linked to account identifier 26 and/or account identifier 56) is applied toward the purchase of goods and/or services. At 150, additional value is optionally loaded on transaction product 10 at a point-of-sale terminal, kiosk, or other area of the retail store or related setting using either account identifier 26 of transaction card 12 or account identifier 56 of transaction sticker 14.

Upon accepting transaction product 10 as payment at 148, the retail store or related setting can subsequently perform either operation 148 or operation 150 as requested by a current bearer of transaction product 10. Similarly, upon loading additional value on transaction product 10 at 150, the retail store or related setting can subsequently perform either operation 150 again or operation 148. In one example, the ability to accept transaction product 10 as payment for goods and/or services is limited by whether the account(s) or record(s) associated with transaction product 10 have any value stored or recorded therein at the time of attempted redemption.

Figure 10:
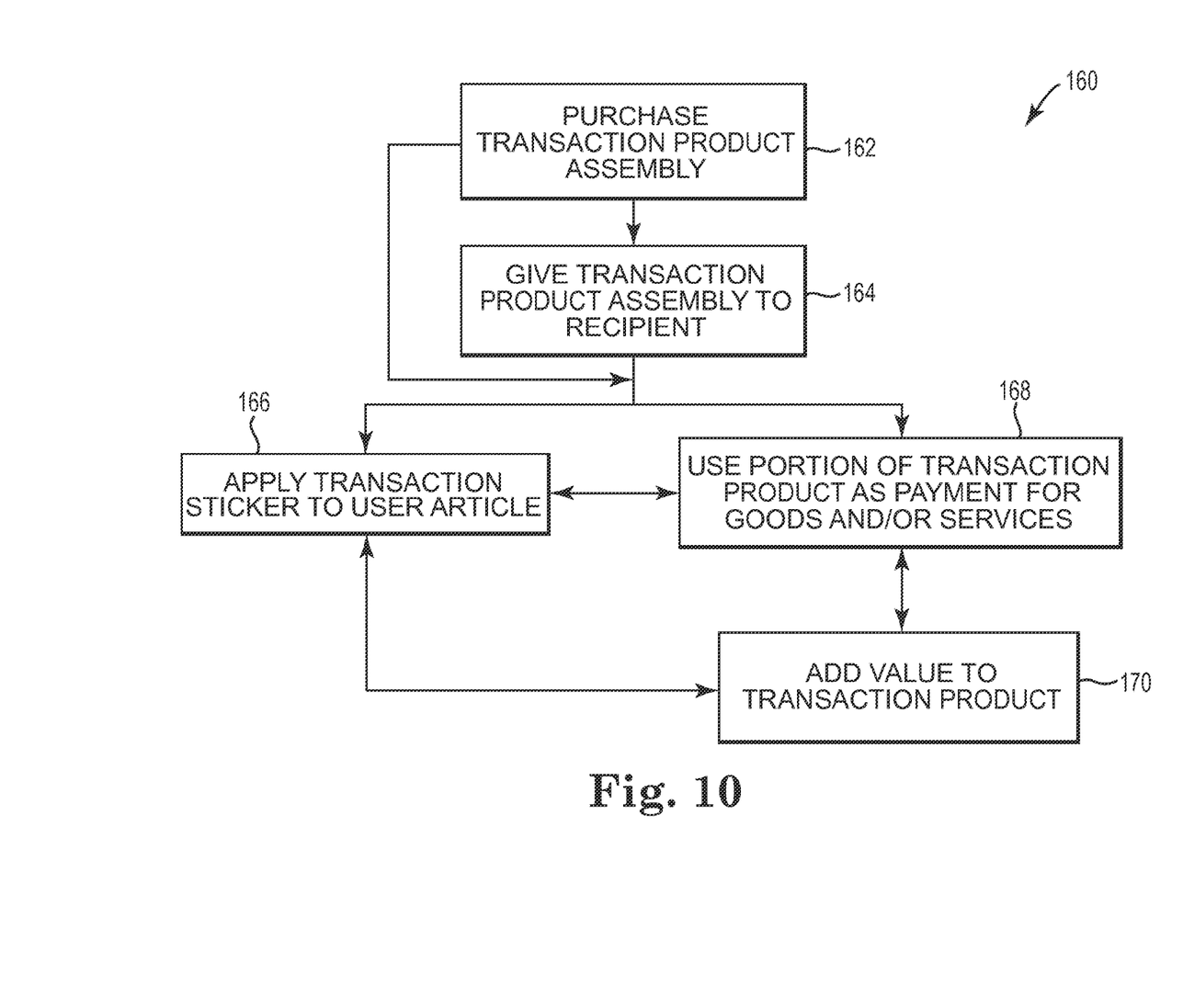
FIG. 10 is a flow chart illustrating a method of using a transaction product assembly, according to one embodiment of the present invention.

FIG. 10 is a flow chart illustrating one embodiment of a method 160 of using transaction product 10 (e.g., FIGS. 1-7). At 162, a potential consumer of transaction product 10, which is displayed in a retail store or viewed on a website, decides to and does purchase transaction product 10 from the retail store or website. It should be understood that transaction product 10 can be displayed and purchased alone or as part of transaction product assembly 70 (FIG. 7) along with backer 72. Upon purchasing transaction product 10, a retail store employee, a retail store kiosk, or other person or device scans or otherwise reads account identifier 26 and/or 56 (account identifier 56 in the illustrated embodiments) to access the one or more accounts linked with account identifiers 26 and/or 56. Upon accessing account identifiers 26 and/or 56, the account or record linked to account identifiers 26 and/or 56 is accessed and activated to load value onto transaction card 12 and/or transaction sticker 14 (i.e., load value to the account or record associated with transaction card 12 and/or transaction sticker 14). In one embodiment, such as where transaction product 10 is purchased at 162 via a website, actual scanning or other mechanical detection of account identifiers 26 and/or 56 may be eliminated.

At 164, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to partygoers, such as at a birthday party, etc. as party favors or gifts. As an alternative, the consumer can keep transaction product 10 for his or her own use thereby eliminating operation 164.

Figure 11:
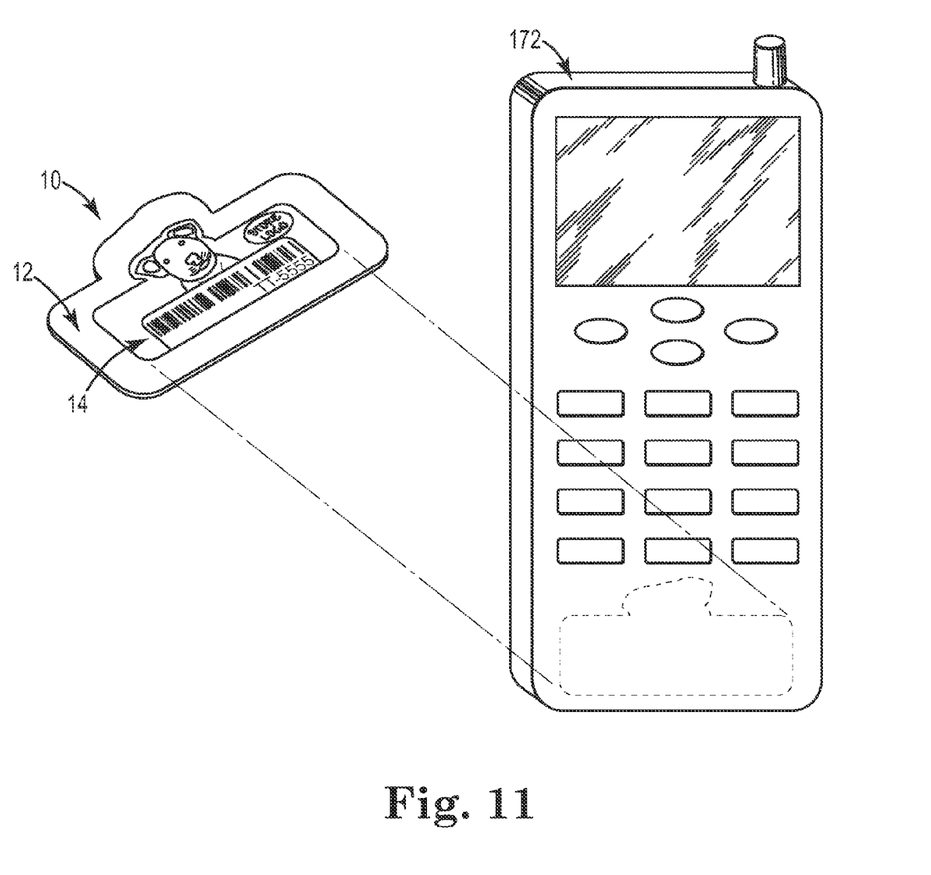
FIG. 11 is a schematic view illustration of a step of using a transaction product, according to one embodiment of the present invention.

At 166, the consumer, recipient, or other current bearer of transaction product 10 interacts with transaction product 10 to peel transaction sticker 14 from transaction card 12 and to place transaction sticker 14 on any desired object in the bearer's possession. For example, as illustrated in FIG. 11, the bearer removes transaction sticker 14 and applies transaction sticker 14 to a substantially clean and substantially smooth surface of any relatively mobile object, such as a surface of a cellular telephone or any other suitable object 172 (e.g., wallet, personal digital assistant, purse, bag, compact, box tin, other transaction card, identification card, other cards, key, key chain member, coffee mug, water vessel, or book).

Once applied to an object, transaction sticker 14 is readily available to the consumer whenever consumer is carrying the corresponding object. In one embodiment, the object selected by the consumer is something the consumer carries with them a majority of the time (e.g., a cell phone or wallet) such that transaction sticker 14 also is available to the consumer a majority of the time without need for the consumer to carry any addition item to complete a transaction using value in the associated account or record. In one embodiment, the adhesive on transaction sticker 14 allows transaction sticker 14 to be relatively easily removed from object 172 without leaving any residue on object 172. In one example, following removal, transaction sticker 14 is configured to remain sufficiently adhesive that transaction sticker 14 can be reapplied to another object of the consumers choosing. In one embodiment, transaction sticker 14 can be removed and reapplied to objects for at least a predetermined number of times, and in one example, the predetermined number of times is indicated on backer 72 or other portion of transaction product assembly 70, for example, as part of instructional indicia 96.

At 168, the consumer or recipient redeems transaction product 10 or any suitable portion thereof (e.g., one of transaction card 12 and transaction sticker 14) for goods and/or services from the retail store or website. In one embodiment, where transaction sticker 14 is coupled to object 172, consumer presents object 172 to a retail employee at a point-of-sale terminal or at a kiosk so that account identifier 56 may be mechanically or otherwise read from transaction sticker 14 on object 172.

At 170, the consumer or recipient of transaction product 10 optionally adds value to transaction product 10, more particularly, to the account(s) or record(s) associated with account identifier 26 and/or account identifier 56, at the retail store or over the Internet (i.e., via the website). In one embodiment, value can be added to the associated account(s) or record(s) using only one of account identifier 26 of transaction card 12 and account identifier 56 of transaction sticker 14. Upon positioning transaction sticker 14 on object 172 at 166, redeeming transaction product 10 at 168 or adding value to transaction product 10 at 170, the consumer or recipient of transaction product 10 subsequently can perform any of operations 166, 168, or 170 as desired. In one embodiment, the ability of the consumer or recipient to repeat redeeming transaction card 12 and/or transaction sticker 14 at 168 is limited by whether the account or record linked with the presented transaction card 12 and/or transaction sticker 14 has any remaining value stored or recorded therein at the time of attempted redemption. In one example, applying transaction sticker 14 to object 172 can only be repeated as long as the adhesive on transaction sticker 14 retains its integrity.

Although described above as occurring at a single retail store or website, in one embodiment, purchasing transaction product 10 at 162, redeeming a portion of transaction product 10 at 168, and adding value to at least a portion of transaction product 10 at 170, can each be performed at any one of a number of stores adapted to accept transaction product 10 or over the Internet. In one example, a number of stores are each part of a chain or are similarly branded stores. In one example, a number of stores include at least one website and/or at least one conventional brick and mortar store.

Figure 12:
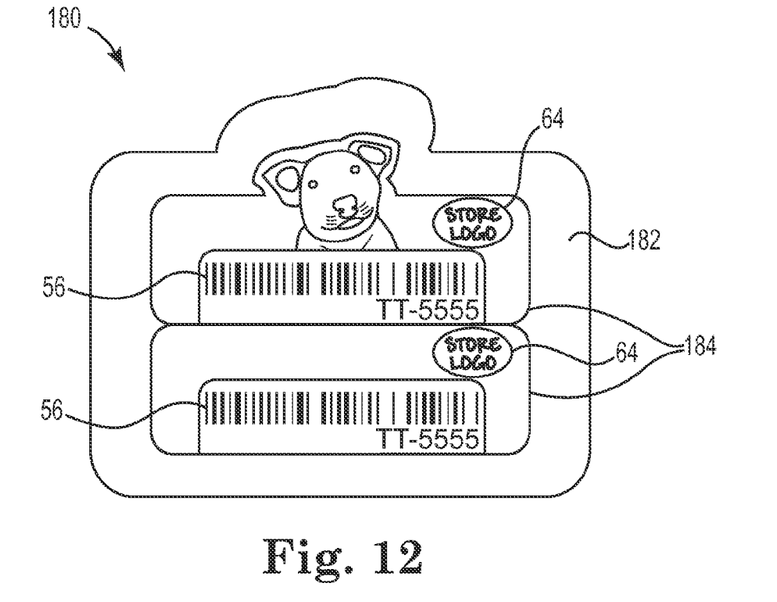
FIG. 12 is a front view illustration of a transaction product, according to one embodiment of the present invention.

Alternatives and other embodiments of transaction products are also contemplated. For example, the front view of FIG. 12 illustrates another embodiment of a transaction product 180. Transaction product 180 is substantially similar to transaction product 10 except where specifically differentiated herein. Transaction product 180 includes a transaction card 182 similar to transaction card 12 and two or more transaction stickers 184. Each transaction sticker 184 includes an account identifier 56, which may be the same or different from each other and/or account identifier 26 on transaction card 12. In one embodiment, two or more transaction stickers 184 collectively cover any inner portion and/or a part of outer portion of transaction card 182. Inclusion of two transaction stickers 184 provides additional mechanisms for accessing the associated account or record. In one embodiment, additional transaction stickers 184 facilitate shared use of an account or records by a plurality of individuals, e.g. family members, coworkers, friends, etc.

Figure 13:
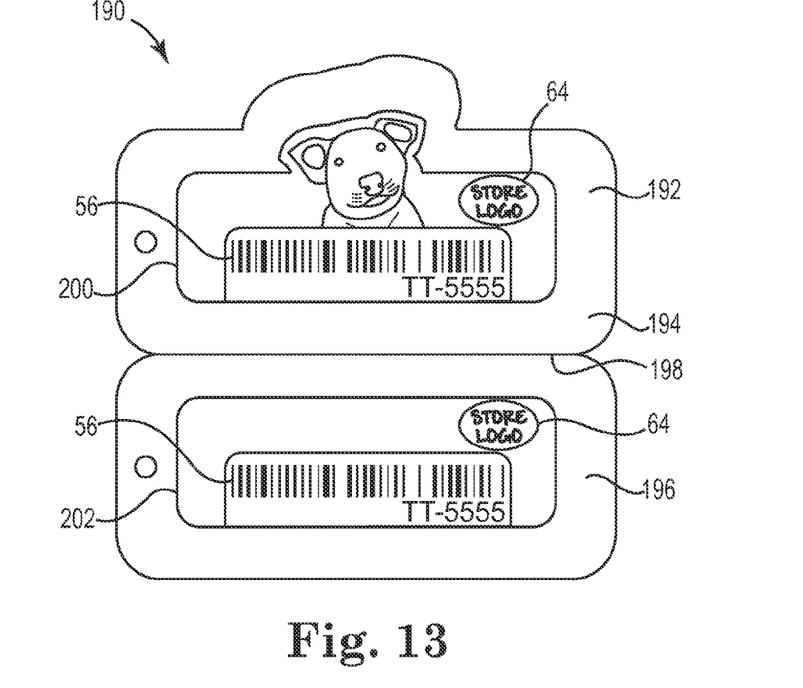
FIG. 13 is a front view illustration of a transaction product, according to one embodiment of the present invention.

The front view of FIG. 13 illustrates another embodiment of a transaction product 190. Transaction product 190 is substantially similar to transaction product 10 except where specifically differentiated herein. Transaction product 190 includes transaction card 192 similar to transaction card 12 except that transaction card 192 defines two card portions 194 and 196 separated by a score line or other line of weakness 198 to facilitate a consumer in separating the two card portions 194 and 196 without using tools. In one embodiment, each card portion 194 and 196 includes its own account identifier similar to account identifier 26 (FIG. 3) on a rear surface thereof (not shown). Such account identifiers may be linked to the same or different accounts or records.

One of transaction stickers 200 and 202 is coupled to a front surface of each card portion 194 and 196. Transaction stickers 200 and 202 are substantially identical to transaction stickers 14 and/or 184. Each transaction sticker 200 and 202 includes an account identifier 56, which may be the same or different from each other and/or account identifier 26 on the corresponding card portions 194 and 196. In one embodiment, each card portion 194 and 196 may be coupled with two or more transaction stickers (not shown). Inclusion of two ore more card portions 194 and 196 provides additional mechanism for accessing the associated account or record. In one embodiment, additional transaction card portions 194 and 196 and additional transaction stickers 200 and 202 facilitate shared use of an account or record by a plurality of individuals, e.g., family members, coworkers, friends, etc.

Transaction cards and stickers come in many forms, according to embodiments of the invention. Stored-value cards and stickers, like other transaction cards, can be "recharged" or "re-loaded" at the direction of the original consumer, the gift recipient or a third party. The term "loading on" or "loaded on" herein should be interpreted to include adding to the balance of an account or record associated with a transaction card or sticker. The balance associated with the transaction card or sticker declines as the card or sticker is used, encouraging repeat visits or use. The card remains in the user's purse or wallet and/or the sticker remains in a readily viewable position, serving as an advertisement or a reminder to revisit the associated merchant. Stored-value cards and stickers according to embodiments of the invention provide a number of advantages to both the consumer and the merchant. Other stored-value cards, transaction cards, and associated stickers according to embodiments of the invention function similarly to loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction product for a retail display comprising:
   a transaction sticker defining a front surface and a rear surface opposite the front surface, wherein:
   the transaction sticker includes a first account identifier, the first account identifier links the transaction sticker to an account or record configured to track a value available for use toward a purchase of one or more of goods and services,
the first account identifier is machine readable by a point-of-sale terminal, and
the rear surface is coated with a pressure sensitive adhesive; and
a transaction card defining a first surface and a second surface opposite the first surface, wherein:
the transaction card includes a second account identifier,
the second account identifier is machine readable by the point-of-sale terminal,
the rear surface of the transaction sticker is releasably coupled to the first surface of the transaction card via the pressure sensitive adhesive, and
the transaction sticker is configured to be removed from the transaction card and applied to a consumer article via the pressure sensitive adhesive.

2. The transaction product of claim 1, wherein the first account identifier is a bar code.

3. The transaction product of claim 1, wherein the first account identifier includes at least one of a bar code, a magnetic strip, a smart chip, and a radio frequency identification (RFID) device.

4. The transaction product of claim 1, wherein the second account identifier is positioned on the second surface of the transaction card.

5. The transaction product of claim 4, wherein the first account identifier is positioned on the front surface of the transaction sticker.

6. The transaction product of claim 1, wherein the second account identifier links the transaction card to the account or record linked to the transaction sticker.

7. The transaction product of claim 6, wherein the first account identifier and the second account identifier are substantially identical.

8. The transaction product of claim 6, wherein the transaction card and the transaction sticker are separately and equally useable to deduct value from the account or record to apply toward the purchase and to reload additional value to the account or record.

9. The transaction product of claim 1, wherein the second account identifier links the transaction card to a second account or record configured to track a second value available toward purchases of one or more of goods and services.

10. The transaction product of claim 1, wherein:
the first surface of the transaction card defines an inner portion and an outer portion visually differentiated from one another to define a visually identifiable boundary between the inner portion and the outer portion,
the transaction sticker is shaped similarly to the visually identifiable boundary and extends over an entirety of the inner portion of the transaction card and less than all of the outer portion of the transaction card, and
the outer portion of the transaction card extends around the transaction sticker to provide a visible border extending around all sides of the transaction sticker.

11. The transaction product of claim 10, wherein:
the transaction card defines a card outer perimeter including non-linear portions,
the transaction sticker defines a sticker outer perimeter shaped similar to but smaller than the card outer perimeter; and
the transaction sticker is positioned on the transaction card spaced from the card outer perimeter on all sides of the transaction sticker.

12. The transaction product of claim 1, wherein:
the transaction sticker is a first transaction sticker, and
the transaction product further comprises a second transaction sticker coupled with the first surface of the transaction card and including a third account identifier.

13. The transaction product of claim 1, wherein:
the transaction card includes a first portion and a second portion separated from the first portion by a score line,
the second account identifier is included on the first portion, and
a third account identifier is fixedly connected to the second portion.

14. The transaction product of claim 13, wherein:
the transaction sticker is a first transaction sticker and is applied to the first portion of the transaction card, and
the transaction product further comprises a second transaction sticker coupled with the second portion of the transaction card and including a fourth account identifier.

15. The transaction product of claim 1, in combination with a backer supporting the transaction product for positioning in the retail display, wherein the backer is configured to fold to substantially enclose the transaction product.

16. The combination of claim 15, further comprising:
a skinning material extending across a surface of the backer, the transaction card, and the transaction sticker to secure the transaction card and the transaction sticker between the surface of the backer and the skinning material, wherein the skinning material is one of translucent and transparent.

17. The transaction product of claim 15, wherein the transaction sticker is configured to be repeatedly removed from one surface and releasably coupled to another surface via the pressure sensitive adhesive for at least a predetermined number of times.

18. The transaction product of claim 1, wherein the transaction member is substantially planar and sized to fit within a wallet.

19. A stored-value assembly comprising:
a planar support member sized to fit within a wallet and defining a first surface, a second surface opposite the first surface, and a support member outer perimeter;
a releasably adhesive label adhered to the first surface of the planar support member, the releasably adhesive label including a first identifier linking the releasably adhesive label to an account having a value available for redemption toward a price of a purchase, wherein:
the releasably adhesive label is configured to be readily removed from the first surface of the planar support member and adhered to a consumer's article,
the releasably adhesive label defines a label outer perimeter shaped similarly to and visually smaller than the support member outer perimeter, and
the releasably adhesive label is positioned on the first surface of the planar support member such that the label outer perimeter is entirely inset from the support member outer perimeter.

20. The stored-value assembly of claim 19, wherein:
the releasably adhesive label defines a front surface and a rear surface opposite the front surface,
the first identifier is machine readable by a point-of-sale terminal,
the rear surface of the releasably adhesive label is coated with a pressure sensitive adhesive; and
the planar support member includes a second identifier machine readable by the point-of-sale terminal.

21. The stored-value assembly of claim 20, wherein the second identifier is secured to the second surface of the planar support member, and the first identifier is secured to the front surface of the releasably adhesive label.

22. The stored-value assembly of claim 19, wherein the second identifier links the planar support member to the account such that the planar support member and the releasably adhesive label can each separately be used to access the account and to be used as tender toward the price of the purchase.

23. A method of encouraging purchase and facilitate use of a transaction product, the method comprising:
- displaying the transaction product to a potential consumer, the transaction product including a releasably adhesive sticker adhered to a substantially planar surface of a support card, wherein:
  - the releasably adhesive sticker includes a first account identifier linking the sticker to an account or record having a value associated therewith, and
  - the releasably adhesive sticker is configured to be readily removed from the substantially planar surface and releasably adhered to a surface of another article;
- promoting that the releasably adhesive sticker is configured to be readily removed from the substantially planar surface and adhered to the surface of another article, wherein promoting includes informing potential consumers that the releasably adhesive sticker can be removed and re-adhered to surfaces for a predetermined number of times before losing sufficient adhesiveness; and
- using a point-of-sale terminal to read the account identifier and activate the record or the account linked to the releasably adhesive sticker to permit subsequent deductions from the value associated with the record or account for application toward one of a purchase and a use of one or more of goods and services.

24. The method of claim 23, wherein:
- the support card includes a second account identifier linking the support card to the account or record, the second account identifier being positioned on a surface of the transaction product opposite the first account identifier, and
- the method further comprises promoting that the support card and the releasably adhesive sticker are separately usable as a transaction device to access value of the account or record for application toward purchase.

* * * * *